UNITED STATES PATENT OFFICE.

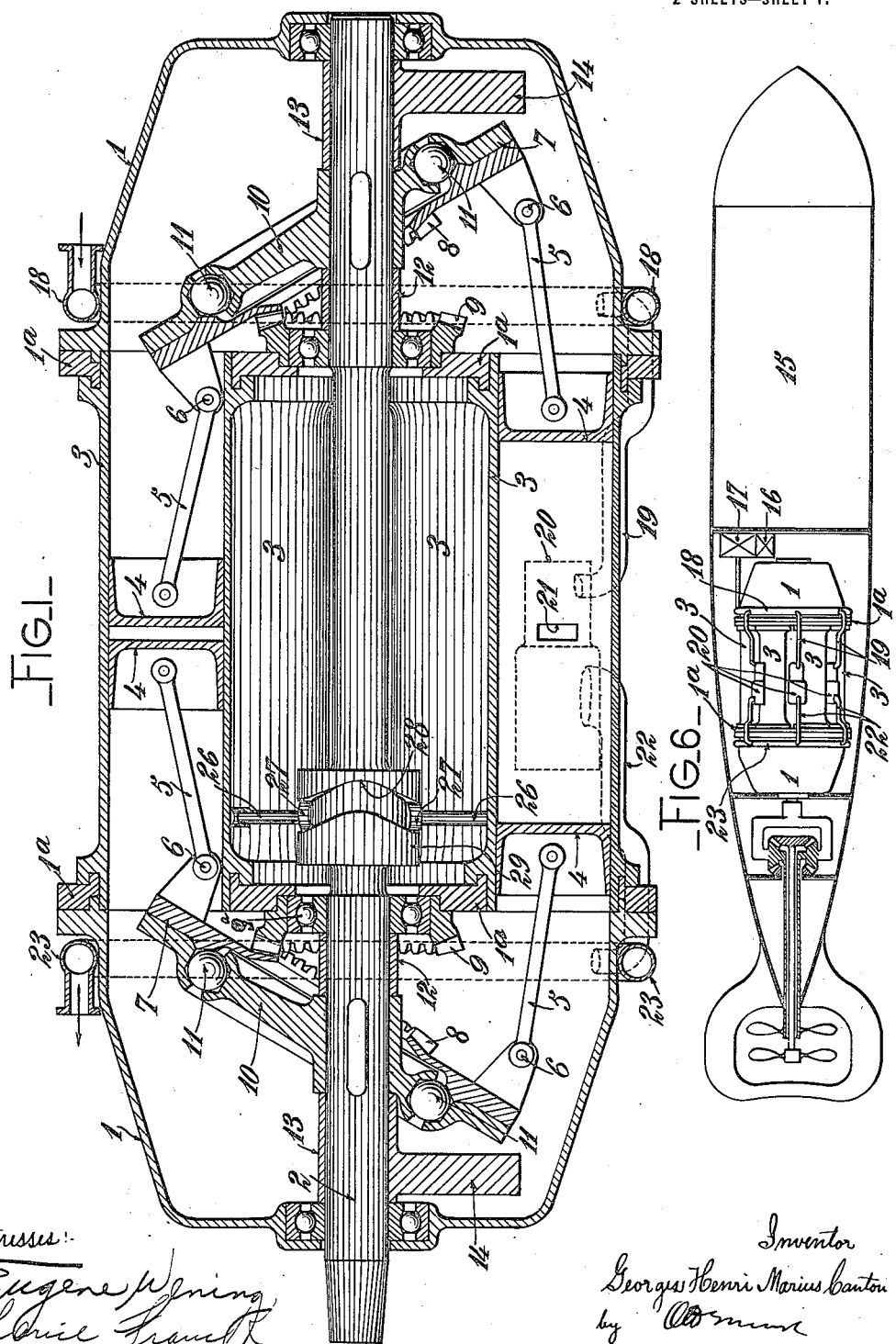

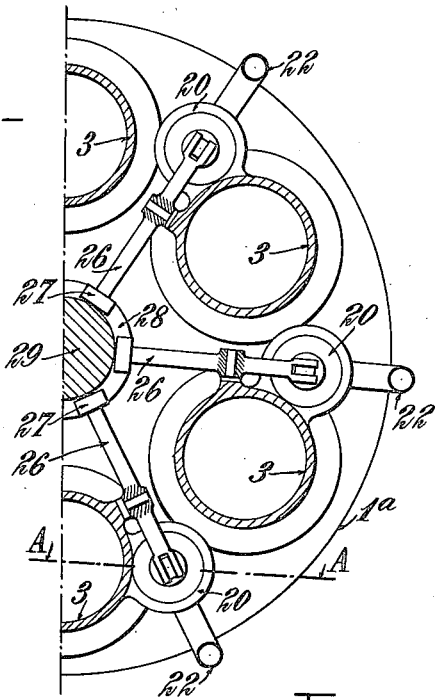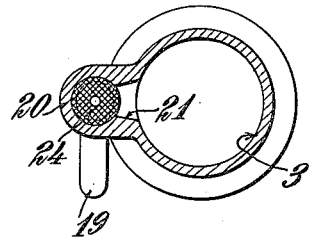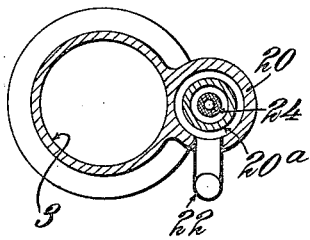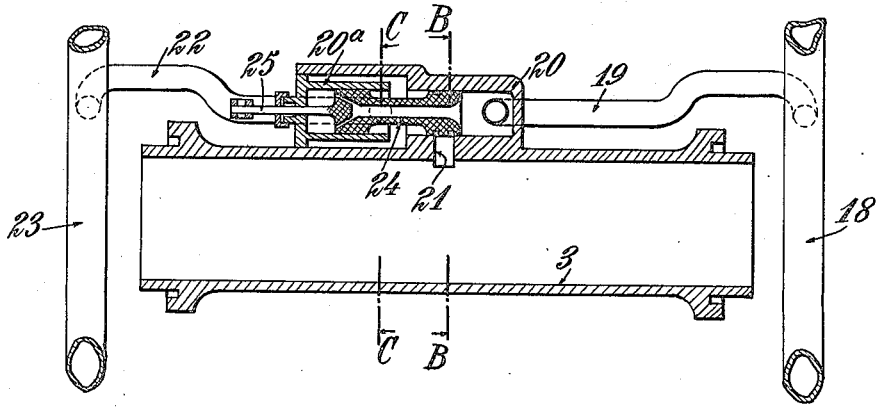

GEORGES HENRI MARIUS CANTON, OF BILLANCOURT, FRANCE, ASSIGNOR TO SOCIETE DES MOTEURS SAHNSON (SYSTEME CANTON-UNNE), OF BILLANCOURT, FRANCE.

FLUID-PRESSURE MOTOR FOR DRIVING TORPEDOES.

1,152,004.   Specification of Letters Patent.   Patented Aug. 31, 1915.

Application filed June 20, 1913. Serial No. 774,760.

*To all whom it may concern:*

Be it known that I, GEORGES HENRI MARIUS CANTON, citizen of the Republic of France, residing at 9 Avenue des Moulineaux, Billancourt, Seine, in the Republic of France, have invented new and useful Improvements in Fluid-Pressure Motors for Driving Torpedoes, of which the following is a specification.

This invention relates to improvements in fluid pressure motors for driving torpedoes.

It is known that motor driven torpedoes actually used in the navies of different countries are driven at a speed which is but little greater than the maximum speed of the most rapid war ships. Under these conditions the chances of success in an attack are slight. This lack of speed in torpedoes is due to the fact that hitherto a motor capable of producing sufficiently high power in a size sufficiently small to be housed in the torpedo has not been produced.

The present invention has for its object a motor intended especially for torpedoes and driven by the same motive fluid usually employed in torpedo motors, that is to say compressed air.

The improved motor comprises several cylinders parallel to the motor shaft each of which cylinders contains two oppositely working pistons, connected by rods and universal joints to inclined oscillatory plates mounted on the motor shaft and coöperating with inclined rotary plates fixed on the said shaft. The distribution of the compressed air is effected by piston valves and the inlet and the exhaust of the motive fluid is operated by annular collectors.

The annexed drawing illustrates an example of construction of the invention.

Figure 1 is a longitudinal section of the motor. Fig. 2 is a transverse half section. Fig. 3 is a partial section on line A—A, Fig. 2. Figs. 4 and 5 are respectively partial sections on lines B—B and C—C of Fig. 3; Fig. 6 is a diagrammatic view in vertical section, of the torpedo provided with the improved motor.

The motor represented comprises a frame or casing provided with two caps 1 in which a shaft 2 rotates on ball bearings. This shaft actuates the propeller or propellers of the torpedo, for instance by means of the known device shown in Fig. 6. The caps carry interiorly plates $1^a$ between which six cylinders 3 are mounted in each of which two pistons 4 work. Each of these pistons is connected by a rod 5 and a joint 6 to an oscillating plate 7 made in two pieces and common to all the pistons 4 situated on the same side of the motor. This oscillating plate is arranged obliquely with regard to the motor shaft 2 which traverses it. One of its diameters is obliged to remain constantly in the same plane passing through the axis of the motor shaft. Each plate 7 is provided with a conical toothed crown 8 the teeth of which engage in those of a corresponding fixed toothed crown 9. The two crowns 9 as well as ball bearings $9^a$ carrying the motor shaft, are supported by plates $1^a$. The oscillating plates 7 transmit the movement of the pistons to the motor shaft by means of inclined rotary plates 10 keyed on said shaft. The transmission of the force between the oscillating plates and the rotary plates is effected by a crown of balls 11. Spacing rings 12, 13 are arranged on the shaft 2 on both sides of the rotary plates 10. The rings 13 carry counter weights 14.

The compressed air, which serves as motive fluid, is contained in the reservoir 15 of the torpedo for example at a pressure of 160 kgr. It is first reduced to a pressure of about 20 kgr. by an expander 16 and is then reheated to about 300° C. in a reheater 17. It passes then into a collector formed by an annular conduit 18 and serving for the admission. From this conduit, branch pipes 19 lead which feed the distribution boxes 20 situated one on the side of each cylinder. These boxes communicate with the corresponding cylinder by a port 21 (Figs. 3 and 4). They are connected also, by branches 22 to a collector 23 formed by an annular conduit analogous to the conduit 18 and serving for the exhaust.

In each distribution box 20 is a piston valve 24 slidable therein and which is also guided in a sleeve $20^a$ fixed inside the box. According to the position of this piston valve, the working chamber between the two motor pistons 4 of the corresponding cylinder, is put in communication with the admission or with the exhaust or is completely cut off therefrom as shown in Fig. 3. Each piston valve carries a rod 25 which is governed by a lever 26 (Fig. 2) pivoted on the cylinder and carrying, at its other end a roller 27 which rolls in a cam groove 28 formed in a sleeve 29 fixed to the motor shaft. This groove or cam is cut so as to successively actuate the various piston valves in order to produce the various phases of the cycle in each cylinder.

The invention is naturally not limited to the details of construction represented and described.

Having now described my invention, what I claim as new and desire to secure by Letters Patent is:

1. In a compressed air motor for driving torpedoes, the combination of a plurality of cylinders extending parallel to the motor shaft, a pair of oppositely working pistons in each cylinder, a two-part oscillating non-rotatable plate connected to each set of pistons, inclined rotary plates keyed on the motor shaft and embraced between the parts of said oscillating plates, and anti-friction means between said plates and through which power is transmitted from the oscillating plates to the rotary plates.

2. In a compressed air motor for driving torpedoes, the combination of a plurality of cylinders extending parallel to the motor shaft, a pair of oppositely working pistons in each cylinder, a two-part oscillating non rotatable plate connected to each set of pistons, inclined rotary plates keyed on the motor shaft and embraced between the parts of said oscillating plates, anti-friction means between said plates and through which power is transmitted from the oscillating plates to the rotary plates, oppositely disposed fixed conical pinions, and a conical pinion carried by each of said oscillating plates, said last named pinions meshing with said fixed pinions.

In testimony whereof I have signed my name to this specification in the presence of two subscribing witnesses.

GEORGES HENRI MARIUS CANTON.

Witnesses:
   Louis Moses,
   Hanson C. Coxe.